US012602301B2

(12) United States Patent
McCain et al.

(10) Patent No.: US 12,602,301 B2
(45) Date of Patent: Apr. 14, 2026

(54) SYSTEM LEVEL TESTING USING A CENTRAL TEST MANAGER

(71) Applicant: INTERNATIONAL BUSINESS MACHINES CORPORATION, Armonk, NY (US)

(72) Inventors: Edward C. McCain, Campbell Hall, NY (US); Rajani Guduru, Bengaluru (IN); Ali Y. Duale, Poughkeepsie, NY (US); Zahed Hossain, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 115 days.

(21) Appl. No.: 18/506,172

(22) Filed: Nov. 10, 2023

(65) Prior Publication Data

US 2025/0156287 A1 May 15, 2025

(51) Int. Cl.
*G06F 11/36* (2025.01)
*G06F 11/26* (2006.01)
*G06F 11/3668* (2025.01)

(52) U.S. Cl.
CPC .......... *G06F 11/26* (2013.01); *G06F 11/3688* (2013.01)

(58) Field of Classification Search
CPC .. G06F 11/26; G06F 11/3688; G06F 9/45533; G06F 9/45558; G06F 2009/45562; G06F 2009/45575; G06F 2009/45587; G06F 2009/45591
See application file for complete search history.

(56) References Cited

U.S. PATENT DOCUMENTS

| | | | | |
|---|---|---|---|---|
| 5,671,351 | A | * 9/1997 | Wild | G06F 11/3698 714/E11.208 |
| 9,032,373 | B1 | * 5/2015 | Gupta | G06F 11/3688 717/127 |
| 9,268,674 | B1 | * 2/2016 | Ben-Cnaan | G06F 11/3688 |
| 9,279,854 | B2 | 3/2016 | Johnson et al. | |
| 11,474,929 | B2 | 10/2022 | Watson et al. | |
| 2004/0107415 | A1 | * 6/2004 | Melamed | G06F 11/3684 717/124 |
| 2014/0181590 | A1 | * 6/2014 | Wefers | G06F 11/3688 714/38.1 |
| 2016/0026562 | A1 | * 1/2016 | Hwang | G06F 11/3692 714/38.1 |
| 2019/0034320 | A1 | * 1/2019 | Stokes | G06F 9/5077 |

(Continued)

OTHER PUBLICATIONS

Wikipedia's Virtual Machine historical version published Aug. 21, 2023 https://en.wikipedia.org/w/index.php?title=Virtual_machine &oldid=1171537138 (Year: 2023).*

(Continued)

*Primary Examiner* — Joseph O Schell
(74) *Attorney, Agent, or Firm* — Edward Wixted, Esq.; Kevin P. Radigan, Esq.; Heslin Rothenberg Farley & Mesiti P.C.

(57) ABSTRACT

A test control process initiates processing of a test case to be used in system level testing of a system unit under test. A query is sent, by the test control process, to a central test manager to determine a history of the test case. The history of the test case is obtained by the test control process based on the query. Processing of the test case continues, based on the history.

20 Claims, 7 Drawing Sheets

(56) References Cited

U.S. PATENT DOCUMENTS

| | | | |
|---|---|---|---|
| 2019/0354675 A1* | 11/2019 | Gan | G06F 11/0712 |
| 2023/0015477 A1* | 1/2023 | Verburg | G06N 20/00 |
| 2023/0072149 A1 | 3/2023 | Watson et al. | |
| 2023/0185700 A1 | 6/2023 | Wong | |
| 2023/0333972 A1* | 10/2023 | Chauhan | G06F 11/3692 |

OTHER PUBLICATIONS

Mitre ATT&CK, "Inter-Process Communication," https://attack.mitre.org/techniques/T1559/, downloaded from internet Jul. 17, 2023, 1 page.

Foufas, Johannes et al., "Continuous Integration and Test from Module Level to Virtual System Level," www.embedded-world.eu, Jan. 3, 2018, 4 pages.

Anonymous, "Module Testbench," IP.com No. IPCOM000271579D, Jan. 13, 2023, pp. 1-17 (+ cover).

Anonymous, "A New Mechanism of Automatic System Test," IP.com No. IPCOM000247607D, Jan. 20, 2016, pp. 1-6 (+ cover).

Anonymous, "Method to Design and Develop Intelligent Automation Test Scripts," IP.com No. IPCOM000182832D, May 7, 2009, pp. 1-8 (+ cover).

HIR, "Heterogeneous Integration Roadmap 2019 Edition, Chapter 17: Test Technology, Section 08: System Level Test," http://eps.ieee.org/hir, Jun. 2019, Chapter 17, pp. 44-51.

Geeksforgeeks, "Inter-Thread Communication in Java," https://www.geeksforgeeks.org/inter-thread-communiation-java/, downloaded from internet Jul. 17, 2023, 10 pages.

Geeksforgeeks, "Inter Process Communication (IPC)," https://www.geeksforgeeks.org/inter-process-communiation-ipc/, downloaded from internet Sep. 12, 2023, 20 pages.

Dow, P. Alex et al., "Duplicate Avoidance in Depth-First Search with Applications to Treewidth," IJCAI 2009, Proceedings of the 21st International Joint Conference on Artificial Intelligence, Jan. 2009, pp. 480-485.

Veerabhadraiah, Sandru et al., "Reducing Duplicate Defects," IJCEM International Journal of Computational Engineering & Management, vol. 16 Issue 1, Jan. 2013, pp. 8-14.

* cited by examiner

100

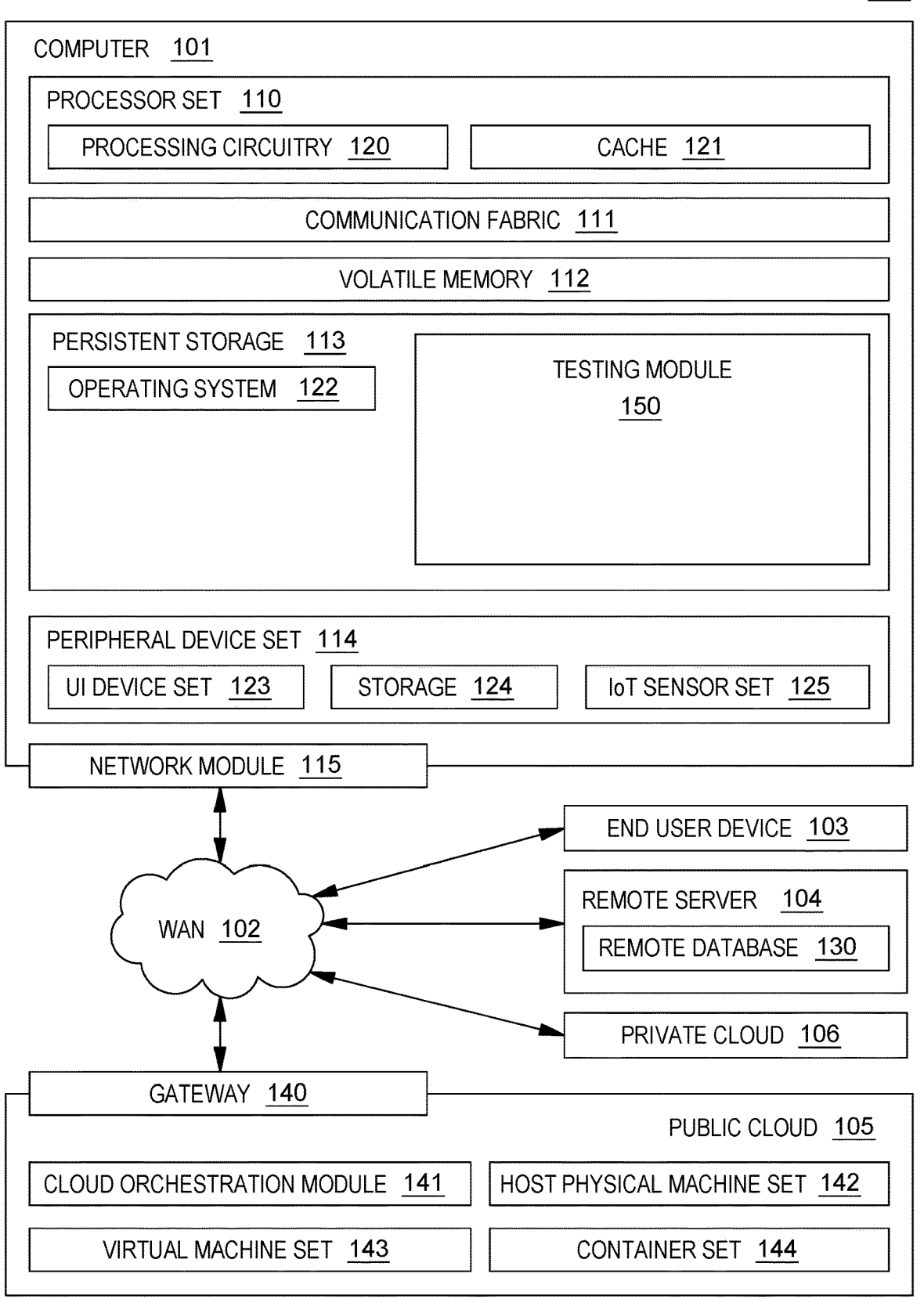

COMPUTER  101

PROCESSOR SET  110

PROCESSING CIRCUITRY  120

CACHE  121

COMMUNICATION FABRIC  111

VOLATILE MEMORY  112

PERSISTENT STORAGE  113

OPERATING SYSTEM  122

TESTING MODULE
150

PERIPHERAL DEVICE SET  114

UI DEVICE SET  123

STORAGE  124

IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141

HOST PHYSICAL MACHINE SET  142

VIRTUAL MACHINE SET  143

CONTAINER SET  144

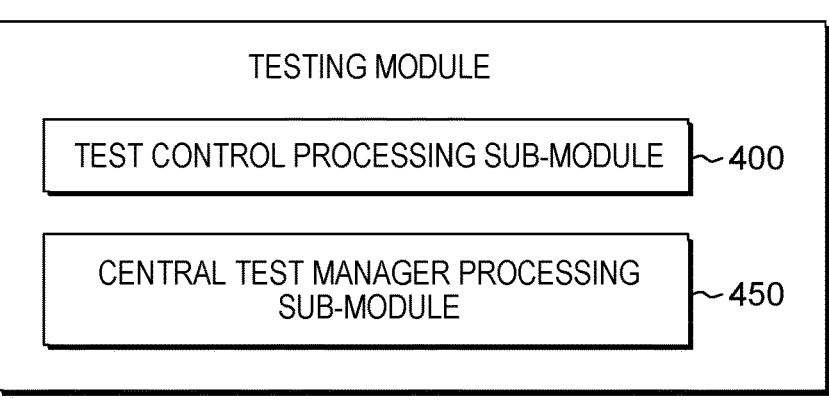

TESTING MODULE

TEST CONTROL PROCESSING SUB-MODULE ~400

CENTRAL TEST MANAGER PROCESSING SUB-MODULE ~450

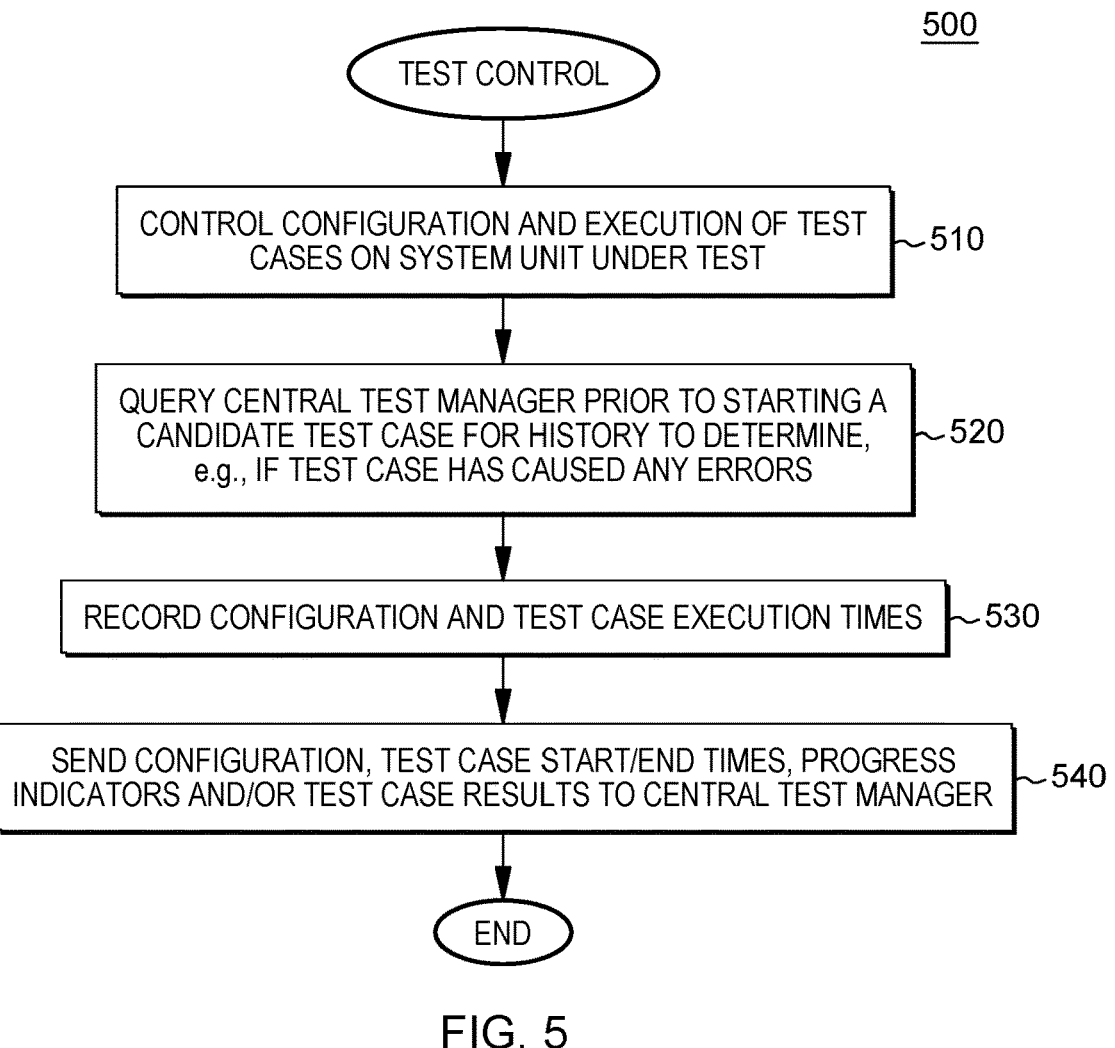

TEST CONTROL

CONTROL CONFIGURATION AND EXECUTION OF TEST CASES ON SYSTEM UNIT UNDER TEST ~510

QUERY CENTRAL TEST MANAGER PRIOR TO STARTING A CANDIDATE TEST CASE FOR HISTORY TO DETERMINE, e.g., IF TEST CASE HAS CAUSED ANY ERRORS ~520

RECORD CONFIGURATION AND TEST CASE EXECUTION TIMES ~530

SEND CONFIGURATION, TEST CASE START/END TIMES, PROGRESS INDICATORS AND/OR TEST CASE RESULTS TO CENTRAL TEST MANAGER ~540

END

CENTRAL TEST MANAGER

ESTABLISH COMMUNICATION WITH
TEST CONTROL PROCESSES                    610

RECEIVE CONFIGURATION TEST CASE INFORMATION
AND RESULTS FROM TEST CONTROL PROCESSES     620

STORE INFORMATION AND RESULTS IN DATA REPOSITORY   630

DETERMINE TEST EXECUTION SEQUENCES
BASED ON TEST EXECUTION RECORDS           640

BASED ON QUERY RELATING TO HISTORY
OF TEST CASE, REPLY TO QUERY              650

END

SYSTEM LEVEL TESTING USING A CENTRAL TEST MANAGER

BACKGROUND

One or more aspects relate, in general, to facilitating processing within a computing environment, and in particular, to facilitating testing and processing based thereon within the computing environment.

System level testing verifies that certain features of the systems under test are functioning correctly. During system level testing, it is expected that errors will occur on one or more of the systems under test since the systems are under development. Some errors may depend on the sequence of events in a system under test.

To correct the errors, attempts may be made to reproduce the errors to verify fixes to the errors.

SUMMARY

Shortcomings of the prior art are overcome, and additional advantages are provided through the provision of a computer program product for facilitating processing within a computing environment. The computer program product includes at least one computer readable storage medium and program instructions collectively stored on the at least one computer readable storage medium. The program instructions collectively stored include program instructions to initiate processing, by a test control process, of a test case to be used in system level testing of a system unit under test. The program instructions collectively stored further include program instructions to send, by the test control process, a query to a central test manager to determine a history of the test case, and program instructions to obtain, by the test control process, the history of the test case, based on the query. Further, the program instructions collectively stored include program instructions to continue processing, by the test control process based on the history, the test case to perform system level testing of the system unit under test.

Computer-implemented methods, systems and computer program products relating to one or more aspects are described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 1 depicts one example of a computing environment to incorporate, perform and/or use one or more aspects of the present disclosure;

FIG. 4 depicts one example of sub-modules of a testing module of FIG. 1, in accordance with one or more aspects of the present disclosure;

FIG. 5 depicts one example of processing of a test control process, in accordance with one or more aspects of the present disclosure;

DETAILED DESCRIPTION

Figure 2:
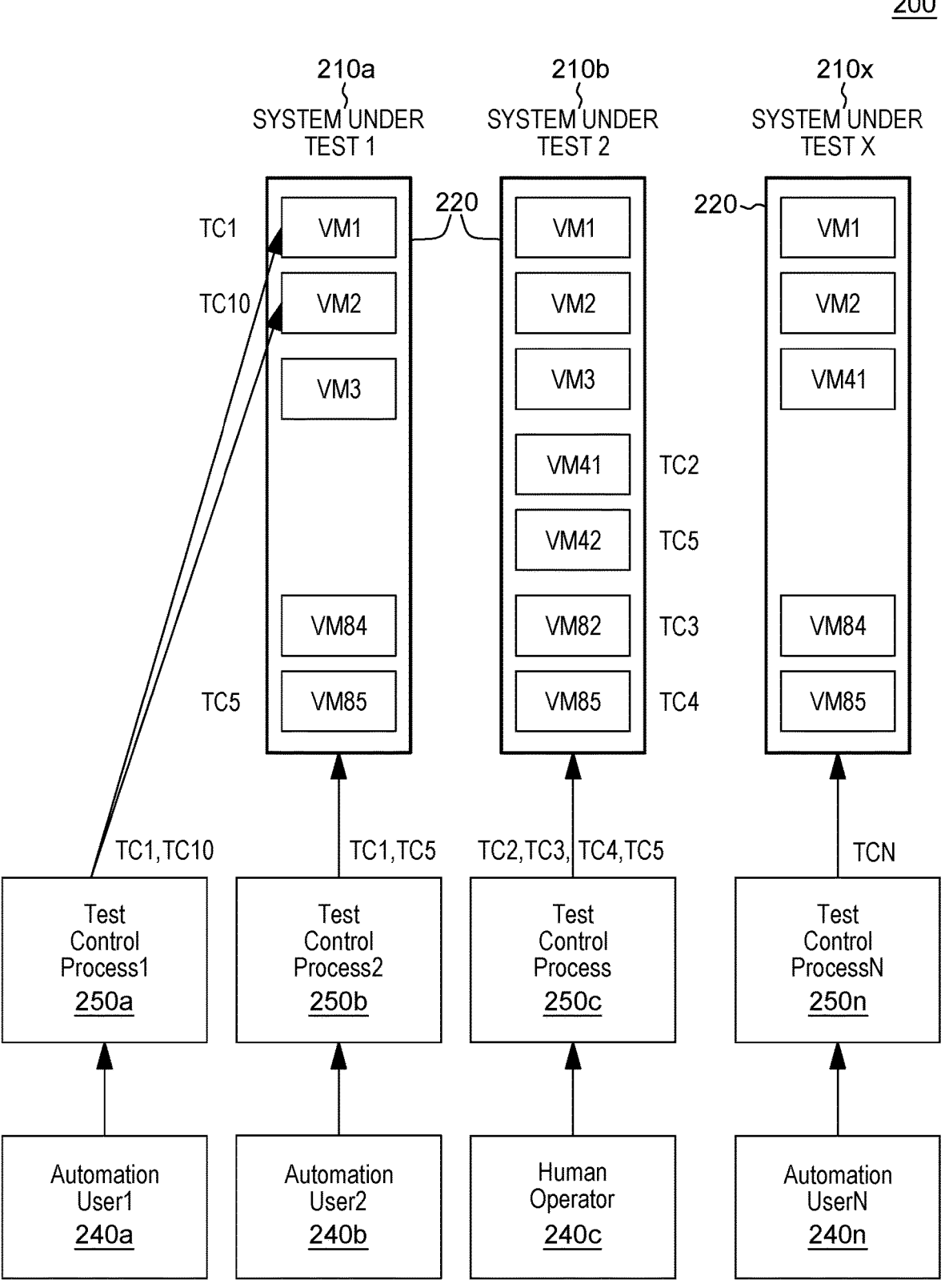
FIG. 2 depicts one example of systems under test in which test control processes operate in isolation in performing system level testing.

In accordance with one or more aspects of the present disclosure, a capability is provided to facilitate processing within a computing environment. In one or more aspects, the capability includes performing system level testing in a multi-execution environment to improve processing within the computing environment. In one or more aspects, system level testing is facilitated by enabling test control processes used to perform system level testing on system units under test (e.g., virtual machines, such as logical partitions) to share information relating to the system level testing. In one example, the test control processes share information with one another via a central test manager coupled to the test control processes.

In one or more aspects, system level testing is performed using a central test manager (also referred to as a central test manager process) and a plurality of test control processes. The central test manager process establishes, for instance, communication with the test control processes, receives configuration test case information and results from the test control processes, stores the configuration test case information and results to a data repository (e.g., event repository, database, etc.), computes test execution sequences based on test execution records, and/or for each query from a test control process, looks up a candidate test case in the database, and replies to the test control process with a history of the candidate test case (e.g., whether the test case has caused errors on a system unit under test in the test control process network or of selected system units under test), as examples. In one example, the test control process network includes one or more system units under test of one or more systems under test.

Each test control process, in one or more aspects, controls the configuration and execution of test cases on a corresponding system unit under test, records configuration and test case execution times of test cases executed on each system unit under test, sends the configuration, test cases start/end times, progress indicators, and/or test case results to the central test manager process via, e.g., a network, and/or queries the central test manager process before starting a candidate test case to determine history of the test case (e.g., whether the test case has caused errors on one or more system units under test in, e.g., the test control process network or of selected units under test), as examples. In one or more examples, execution of a given test case depends on the history of the test case. Further, in one or more examples, a test control process may control execution of the test case based on a pre-defined preference provided by, e.g., a tester, including, for instance, a selected machine configuration to be used for the testing. Other examples are possible.

One or more aspects of the present disclosure are incorporated in, performed and/or used by a computing environment. As examples, the computing environment may be of various architectures and of various types, including, but not limited to: personal computing, client-server, distributed, virtual, emulated, partitioned, non-partitioned, cloud-based, quantum, grid, time-sharing, cluster, peer-to-peer, wearable, mobile, having one node or multiple nodes, having one processor or multiple processors, and/or any other type of environment and/or configuration, etc. that is capable of executing a process (or multiple processes) to, e.g., perform testing and/or one or more other aspects of the present disclosure. Aspects of the present disclosure are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

One example of a computing environment to perform, incorporate and/or use one or more aspects of the present disclosure is described with reference to FIG. 1. In one example, a computing environment 100 contains an example of an environment for the execution of at least some of the computer code involved in performing the inventive methods, such as testing code or module 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above is only one example of a computing environment to incorporate, perform and/or use one or more aspects of the present disclosure. Other examples are possible. For instance, in one or more embodiments, one or more of the components/modules of FIG. 1 are not included in the computing environment and/or are not used for one or more aspects of the present disclosure. Further, in one or more embodiments, additional and/or other components/modules may be used. Other variations are possible.

In accordance with one or more aspects, a computing environment (e.g., computing environment 100, other computing environments) may include a plurality of machines, each of which is a system under test. In such an environment, the systems under test may be in development and/or used for testing code and/or may be in a production environment but further used for testing. Many examples are possible.

One example of a computing environment that includes a plurality of systems under test is depicted in FIG. 2. In one example, a computing environment 200 includes a plurality of systems under test 210*a*-210*x*, each executing a plurality of virtual machines (VM) 220 (e.g., logical partitions, zones, other types of virtual machines). Each virtual machine operates in isolation, and in one example, is a system unit under test of one of the systems under test.

As shown, in one example, a plurality of users 240*a*-240*n* initiates testing on one or more system units under test (e.g., one or more virtual machines) to perform system level testing. For instance, automation user 1 (240*a*), which is, for instance, a process, program, script, etc., initiates a test control process 250*a* (e.g., Test Control Process1) that executes one or more test cases (e.g., TC1, TC10 and/or other TCs) to perform system level testing on one or more virtual machines (e.g., VM 1, VM 2 and/or other VMs) of a system under test 210*a* (e.g., System Under Test 1 and/or other systems under test); automation user 2 (240*b*) initiates a test control process 250*b* that executes one or more test cases (e.g., TC1, TC5 and/or other TCs) to perform system level testing on one or more virtual machines (e.g., VM 85 and/or other VMs) of system under test 210*a* and/or other systems under test; a human operator 240*c* initiates a test control process 250*c* that executes one or more test cases (e.g., TC2, TC3, TC4, TC5 and/or other TCs) on one or more virtual machines (e.g., VM41, VM42, VM82, VM 85 and/or other VMs) of a system under test 210*b* (and/or other systems under test) that are, for instance, manually controlled using, for instance, an interface (e.g., command line, script, graphical user interface, etc.); and automation user n (240*n*) initiates a test control process 250*n* that executes one or more test cases (TCN) to perform system level testing on one or more virtual machines of system under test 210*x* and/or other systems under test. Each test control process performs system level testing (e.g., initiates and controls execution of one or more test cases (TC)) but in isolation of the other test control processes, regardless of whether they are automated or manually controlled.

Currently, in automated system test environments (e.g., environment 200), there is no inter-communication framework among test control processes. That is, there is no way to communicate between test control processes. Thus, it is difficult to reproduce some errors, since information and/or context in which the error occurred is missing, such as the sequence of events that caused the error, etc.

Therefore, in accordance with one or more aspects of the present disclosure, to increase efficiency and productivity in an automated system test environment, communication and cooperation among test control processes is provided. For instance, communication among a plurality of test control processes used to perform system level testing of a system under test (or multiple systems under test) is provided via a central test manager coupled to the plurality of test control processes. The central test manager, as an example, receives information regarding the test cases being executed from the plurality of test control processes, saves the information in a repository and answers queries regarding candidate test cases to be executed by a test control process. The answers are based on the information received from other test control processes regarding similar test cases. By providing inter-communication among the test control processes, information to reproduce and debug a problem (e.g., contextual information, examples of which are described herein) that was not previously available when executing multiple test cases in parallel, is now available, facilitating testing, correcting of errors, bringing code to production and/or making a system under test available for production, as examples.

When executing test cases on multiple system units under test (e.g., virtual machines executing on one or more systems under test) in parallel, there is a high probability that the test cases will find duplicate problems. Thus, in accordance with one or more aspects, the test control processes are informed of the state of the other test control processes when running on the same system under test and/or different systems under test (e.g., one or more systems under test in a network of a given test control process). In one embodiment, each test control process is provided the ability to detect and write problem tickets and communicate that to the other test control processes.

In one or more aspects, runtime decision making is employed to forecast the feasibility of candidate or future test cases (i.e., avoid duplicate problems in real time). The collection of meaningful/contextual data is facilitated for post-run analysis to reproduce/debug problems that are found and to understand the context of test cases at any given time and avoid duplicate tickets being written. Re-creation of a given environment is enabled allowing for correction verification (e.g., merge the run logs). Duplicate problem writing, during post analysis, is minimized. The health of the test cases is monitored and reported to determine whether similar test cases deviate from known runtime/results.

In accordance with one or more aspects, a test control process may experience one or more failures (even excessive failures) caused by specific test cases. The test control process, in one example, writes tickets on those problems and alerts other test control processes about such test case related failures—e.g., writes or provides the information to a common/shared location. The other test control processes can choose to avoid running such test cases and/or can choose to run such test cases in an attempt to obtain additional data or different kinds of an error, as examples. Other variations are possible. The other test control processes document in their reports the failing test cases-pointing to data collected by the initial test control process. Other examples are possible.

Figure 3:
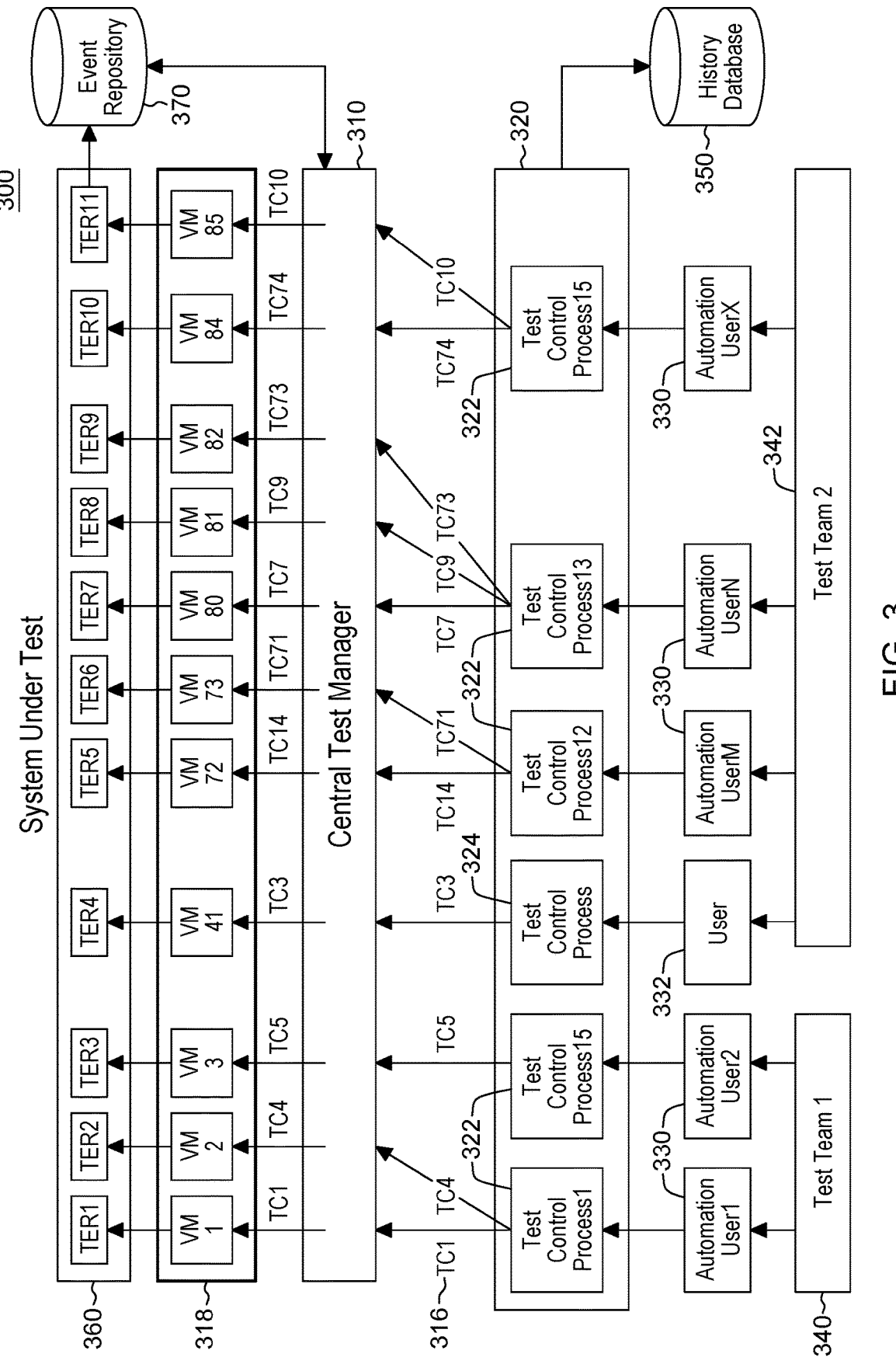
FIG. 3 depicts one example of a system under test in which test control processes cooperate with one another through a central test manager to perform system level testing, in accordance with one or more aspects of the present disclosure.

To facilitate sharing of information (e.g., contextual information) relating to errors and/or failures in testing, a central test manager is used, in one or more aspects. Referring to FIG. 3, in one example, a system under test 300 includes a central test manager 310 used to provide inter-communication among a plurality of test control processes 320. The plurality of test control processes includes, in this example, a plurality of test control processes 322 initiated and controlled by a plurality of automation users 330 and a test control process 324 initiated and controlled by a manual user 332. In other examples, there are additional, fewer and/or other test control processes, additional, fewer and/or other automation users and/or additional, fewer (even none) and/or other manual users. Many examples are possible.

In one example, the users are optionally considered members of teams. For instance, in the example in FIG. 3, automation users 1 & 2 (330) are included as members of Test Team 1 340; and user 332 and automation users M, N & X (330) are included as members of Test Team 2 (342). Other examples are possible including other configurations of teams or even no teams. Many examples and variations are possible.

In one example, test control processes 320 provide test cases (TC) 316 to be executed on a set of system units under test 318 (e.g., a set of virtual machines). The test cases and/or test control processes are maintained, in one example, in a data repository, such as a history database 350 (or multiple history databases). History database 350 includes, for instance, configuration and/or execution times of test cases. In one example, history database 350 maintains separately the information for a particular test control process (e.g., test case information for one test control process is not accessible to other test control processes).

The test cases 316 are executed on the plurality of system units under test 318. For instance, test case 1 (TC1) is executed on virtual machine 1; test case 4 (TC4) is executed on virtual machine 2; test case 5 (TC5) is executed on virtual machine 3; test case 3 (TC3) is executed on virtual machine 41; test case 14 (TC14) is executed on virtual machine 72; test case 71 (TC71) is executed on virtual machine 73; test case 7 (TC7) is executed on virtual machine 80; test case 9 (TC9) is executed on virtual machine 81; test case 73 (TC73) is executed on virtual machine 82; test case 74 (TC74) is executed on virtual machine 84; and test case 10 (TC10) is executed on virtual machine 85. Additional, fewer and/or other test cases may be executed on additional, fewer and/or other virtual machines and/or other system units under test. Further, there may be additional, fewer and/or other virtual machines and/or other system units under test.

Based on executing a test case, a current test execution record (current TER) 360 is produced and saved in a repository, such as an event repository 370. As an example, event repository 370 includes current test execution records and past test execution records. In another example, there is a current test execution records repository and a past test execution repository. Various examples are possible. For a given test execution record, execution information such as, start/end times of a test case, progress indicators and/or results are stored in the event repository. Additional, fewer and/or other information may be stored.

By saving the test execution record in a central repository, such as event repository 370, which stores information for multiple test control processes and is acessible by the central test manager, the central test manager can observe any errors and provide testing guidance, based thereon. For instance, it can determine if a particular test case has caused errors and provide an indication of such to a test control process. The test control process can then refrain from using that test case until the code has been corrected and/or use the test case in an attempt to reproduce the error. Other examples are possible. Further, in one or more examples, central test manager 310 using, for instance, artificial intelligence and/or machine learning may suggest changes to a test case and/or an aspect of a system under test (e.g., a change to the machine configuration (e.g., number of processors, amount of memory, etc.)), etc. Many variations are possible.

In one or more aspects, to facilitate system level test processing, a testing module, such as testing module 150, is used. In one example, a testing module (e.g., testing module 150) includes various sub-modules to be used to facilitate and/or perform testing and/or tasks relating thereto. The sub-modules are, e.g., computer readable program code (e.g., instructions) in computer readable media, e.g., storage (persistent storage 113, cache 121, storage 124, other storage, as examples). Although, as an example, testing module 150 is depicted in FIG. 1 in persistent storage 113, one or more sub-modules may be in other storage, etc. Many variations are possible.

The computer readable media may be part of one or more computer program products and the computer readable program code may be executed by and/or using one or more devices (e.g., one or more computers, such as computer(s) 101 and/or other computers; one or more servers, such as remote server(s) 104 and/or other servers; one or more end user devices, such as end user device(s) 103 and/or other end user devices; one or more processors or nodes, such as processor(s) or node(s) of processor set 110 and/or other processors or nodes; processing circuitry, such as processing circuitry 120 of processor set 110 and/or other processing circuitry; and/or other devices, etc.). Additional and/or other computers, servers, end user devices, processors, nodes, processing circuitry and/or other devices may be used to execute one or more of the sub-modules and/or portions thereof. Many examples are possible.

One example of sub-modules of testing module 150 is described with reference to FIG. 4. As an example, testing module 150 includes, for instance, a test control processing sub-module 400 and a central test manager processing sub-module 450. Additional, fewer and/or other sub-modules may be used to perform testing and/or tasks related thereto. Other variations are possible. Although various sub-modules are described, a testing module, such as testing module 150, may include additional, fewer and/or different sub-modules. A particular sub-module may include additional code, including code of other sub-modules, less code, and/or different code. Further, additional and/or other modules may be used to facilitate testing and/or perform related tasks. Many variations are possible.

In one example, test control processing sub-module 400 controls the configuration and execution of test cases on a corresponding system unit under test; records configuration and test case execution times of test cases executed on each system unit under test; sends the configuration, test case start/end times, progress indicators and/or test case results to a central test manager process via, e.g., a network; and/or queries the central test manager process before starting a candidate test case to obtain history of the test cast (e.g., determine if the test has caused errors on other systems units under test), as examples. In one or more examples, a test control process may execute one or more selected test cases, based on, e.g., one or more pre-defined preferences.

In one example, central test manager processing sub-module 450 establishes communication with each (or selected) test control process; receives configuration test case information and results from test control processes and stores the information and results to a data repository, e.g., a database, an event repository, etc.; computes test execution sequences based on test execution records; and/or for each query from a test control process, looks up candidate test cases in the data repository, and replies to the test control process with history relating to the candidate test cases (e.g., whether a test case has previously caused errors on a system unit under test in the network of the test control process), as examples.

Figure 6:
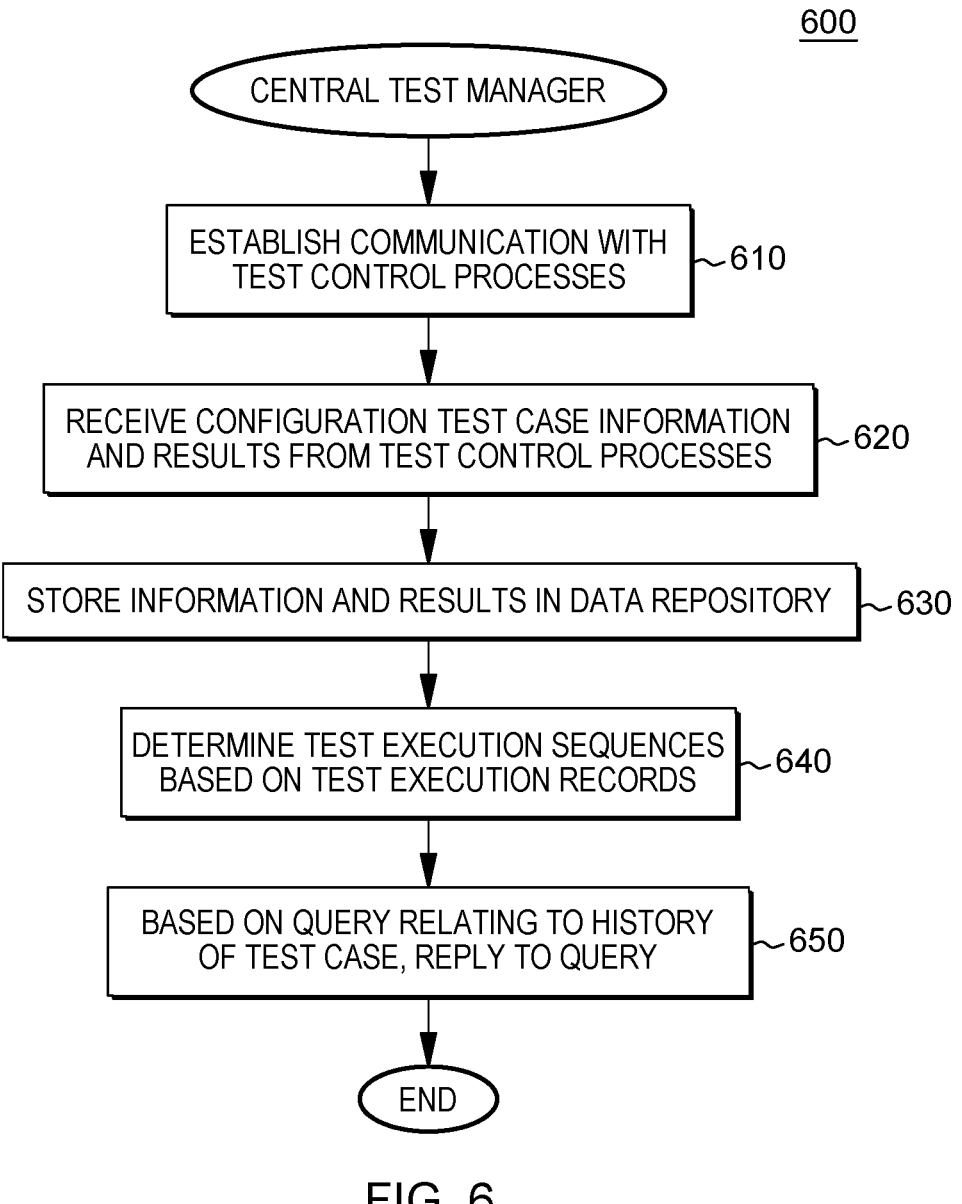
FIG. 6 depicts one example of processing of a central test manager, in accordance with one or more aspects of the present disclosure.

One or more of the sub-modules are used, as described herein, to perform system level testing, an example of which is described herein with reference to FIGS. 5-6. In one example, a test control process (e.g., a test control process 500; FIG. 5) is implemented using one or more of the sub-modules (e.g., sub-module 400) and a central test manager process (e.g., central test manager process 600; FIG. 6) is implemented using one or more of the sub-modules (e.g., sub-module 450). Each process is executed by one or more devices (e.g., one or more computers (e.g., computer(s) 101, other computer(s), etc.), one or more servers (e.g., server(s)

104, other server(s), etc.), one or more end user devices (e.g., end user device(s) 103, other end user device(s), etc.), one or more processors, nodes and/or processing circuitry, etc. (e.g., of processor set 110 or other processor sets), and/or one or more other devices, etc.). Although example computers, servers, end user devices, processors, nodes, processing circuitry and/or devices are provided, additional, fewer and/or other computers, servers, end user devices, processors, nodes, processing circuitry and/or devices may be used for test control processing, central test manager processing and/or other processing. Various options are possible.

In one example, referring to FIG. 5, test control process 500 (also referred to as process 500) controls 510, for instance, configuration and execution of test cases on a system unit under test (e.g., a virtual machine under test, such as a logical partition). For example, process 500 develops and/or selects one or more test cases to be used to perform system level testing on the system unit under test, determines a sequence of test cases, and/or determines a timeline for execution of the test cases, etc. In one example, process 500 processes a test case based on a pre-defined preference (e.g., selected machine configuration). As examples, the system level testing tests the functionality of a system under test (e.g., whether it is functioning as expected), tests whether the resources provided to the system under test are sufficient and/or as requested, and/or tests whether selected programs execute correctly on the system under test. Other examples are also possible.

In one embodiment, process 500 queries 520 a central test manager (e.g., central test manager 310) prior to starting (or as part of initiating) a candidate test case to obtain history of the test case (e.g., determine if the test case has caused any errors on one or more other system units under test, etc.). Based on the reply to the query indicating an error, in one embodiment, test control process 500 changes the configuration of test cases (e.g., the test cases to be executed, start times of execution, and/or sequence of execution, etc.) by selecting a different test case, modifying the test case and/or changing execution time of the test case, as examples. In another embodiment, based on the reply indicating an error, the test control process may still decide to execute the test case. Other examples are possible.

Further, in one or more embodiments, test control process 500 records 530, for instance, the configuration of test cases and test case execution times of test cases executed on each system unit under test in a repository, such as a database (e.g., history database 350), and sends 540, for instance, the configuration, test cases start/end times, progress indicators and/or test case results to the central test manager.

One example of processing of a central test manager (e.g., central test manager 310) is described with reference to FIG. 6. In one example, a central test manager process 600 (also referred to as process 600) establishes communication 610 with one or more test control processes via, e.g., a network. It receives 620 configuration test case information and results of executing test cases from the one or more test control processes and saves 630 the information and results in a repository, such as a database or an event repository (e.g., event repository 370). This allows the information to be available for future consideration.

In one example, central test manager process 600 determines 640 test execution sequences based on test execution records obtained from testing one or more systems under test by one or more test control processes. This allows a system unit under test to run the same test sequence to re-create an error, if desired.

In one example, based on central test manager process 600 receiving a query regarding history of a test case, the central test manager process checks 650 its repository (e.g., event repository 370) to determine the test case history (e.g., whether the test case has caused any errors, whether it was successful, whether there is no history yet, etc.). If there are errors, central test manager process 600 provides the error information to the requesting test control process. If there are no errors, this information is also provided, in one example, to the requesting test control process. Other examples are possible.

Further details relating to starting a new test case by a test control process are described with reference to FIG. 7. In one example, a test control process 700 (also referred to as process 700) is executed by one or more devices (e.g., one or more computers (e.g., computer(s) 101, other computer(s), etc.), one or more servers (e.g., server(s) 104, other server(s), etc.), one or more end user devices (e.g., end user device(s) 103, other end user device(s), etc.), one or more processors, nodes and/or processing circuitry, etc. (e.g., of processor set 110 or other processor sets), and/or one or more other devices, etc.). Although example computers, servers, end user devices, processors, nodes, processing circuitry and/or devices are provided, additional, fewer and/or other computers, servers, end user devices, processors, nodes, processing circuitry and/or devices may be used for test case processing and/or other processing. Various options are possible.

Figure 7:
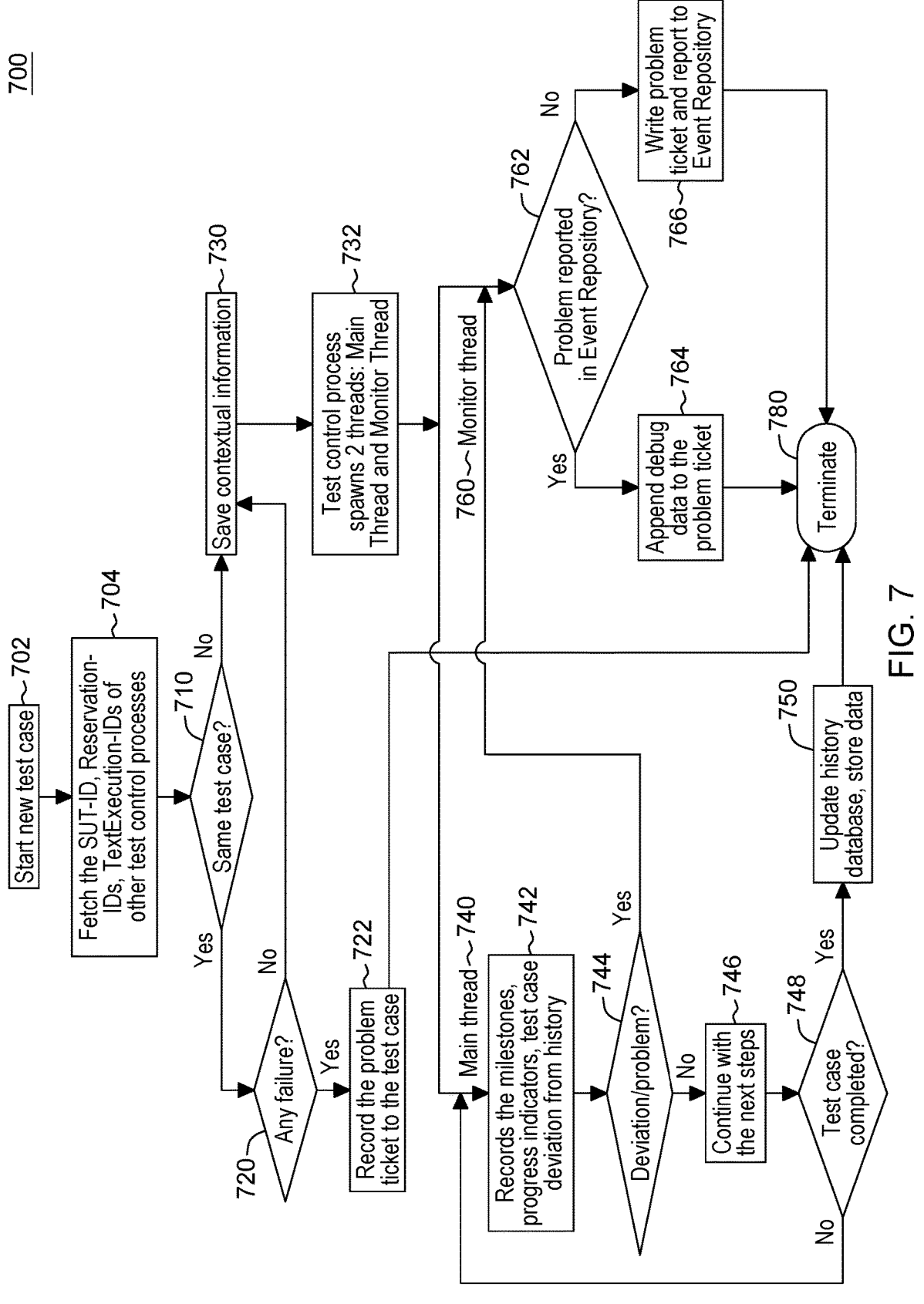
FIG. 7 depicts another example of processing of a test control process, in accordance with one or more aspects of the present disclosure.

Referring to FIG. 7, in one example, test control process 700 initiates processing 702 of a new test case. Based on initiating processing of the new test case, in one example, process 700 fetches 704 an identifier of the system unit under test (SUT-ID) (e.g., an identifier of the virtual machine under test), as well as reservation identifiers and test execution identifiers of other test control processes running in parallel. A reservation id and text execution id identifies, for instance, a particular test case running on a system unit under test at a given time on a given system under test with a set of test case requirements.

In one example, test control process 700 determines 710 whether the test case being started is the same as a test case that has already been executed. If it is the same as another test case, process 700 determines 720 a history of the test case (e.g., whether a failure has been reported for the test case). In one example, this is determined by querying a central test manager (e.g., central test manager 310). Based on a failure being reported, in one example, process 700 records 722 a problem ticket to the test case, and test control process 700 terminates 780 the test case.

However, if a failure has not been reported or if it is not the same test case, then in one example, test control process 700 saves 730 information (e.g., contextual information) relating to the system under test, the system unit under test and/or the test case. For instance, the contextual information includes a system configuration (e.g., resources at system level, available processors, operating system, IML (initial machine load) status, current IOCDS (input/output configuration data set), memory available, PCHIDs (physical channel identifiers), active virtual machines (e.g., logical partitions), virtual machine configuration of the active virtual machines workloads, memory configuration, adapters, FICON (fibre connection) switches, PCHIDs and CHPIDs (channel identifiers) mapping, and/or resource allocation (e.g., processors type and number of processors allocated, etc.)), performance characterization, errors reported, problem tickets, success information, and/or test case information (e.g., start time, end time, in progress, running, etc.) for the system under test (e.g., each virtual machine (e.g., logical partition) under test, etc. The contextual information may include additional, fewer and/or other information.

In one example, test control process 700 spawns 732 two threads: a main thread 740 and a monitor thread 760. In main thread 740, in one example, test control process 700 records 742 one or more milestones of the test case, as well as one or more progress indicators and any test case deviation from history, as examples. Test control process 700 determines 744 if there is a deviation or problem with the test case. If there is no deviation or problem, test control process 700 continues 746 with the next steps, including determining 748 if the test case is complete. If the test case is not complete, process 700 continues to record 740 the milestones, etc. However, if the test case is complete 748, process 700 updates 750 the history database (e.g., history database 350) with information from the test case and stores the data. Process 700 terminates 780 the test case.

In one example, monitor thread 760 determines 762 if a problem is reported in the event repository (e.g., event repository 370). For instance, test control process 700 sends a query to the central test manager process that checks whether a problem has been reported and replies to the test control process with history status. If a problem has been reported, then, in one example, test control process 700 appends 764 debug data to the problem ticket and terminates 780 the test case. However, if a problem has not been reported, then, in one example, test control process 700 writes 766 a problem ticket and reports the problem to the event repository (e.g., reports to the central test manager that stores the reported problem in the event repository). Test control process 700 terminates 780 the test case.

Figure 8:
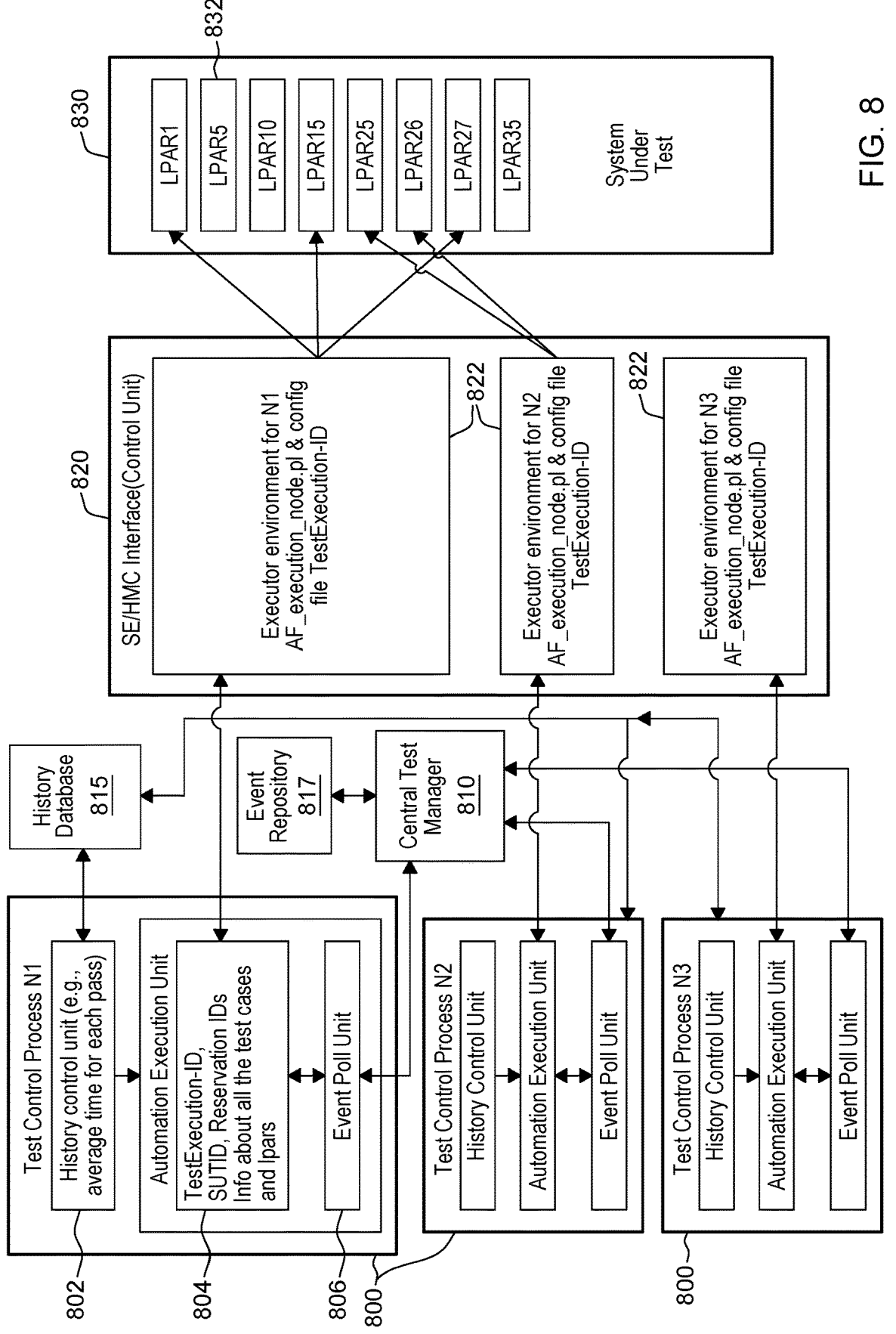
FIG. 8 depicts further details of a computing environment that includes a central test manager to perform system level testing, in accordance with one or more aspects of the present disclosure.

As indicated above, test control processes use a central test manager in performing system level testing. As shown in FIG. 8, a plurality of test control processes 800 is coupled to a central test manager 810, as well as to a control unit 820, such as a service element (SE)/hardware management console (HMC). Control unit 820 is used to, e.g., control configuration of a plurality of logical partitions (lpars) 832 of a system under test 830 and/or to facilitate system level testing of the logical partitions, as examples. Each logical partition (an example of a virtual machine) is, for instance, a system unit of the system under test.

In one example, each test control process 800 includes, for instance, a history control unit 802 to, e.g., forward information regarding a test case to one or more data repositories, such as a history database 815. The information may include, for instance, start/end execution times of a test case and/or average time for each execution pass, etc.

Further, in one example, test control process 800 includes an automation execution unit 804 that initiates and/or controls execution of a test case. For instance, it provides to control unit 820 information regarding the test case and on which system units under test (e.g., the logical partitions) to execute the test case. Control unit 820 is responsible for, e.g., forwarding the test case to the indicated system units under test to enable those systems units under test to execute the test case. In one example, control unit 820 includes an executor environment 822 for each test control process 800; however, in other examples, there may be additional, fewer and/or other environments. Many variations are possible.

Automation execution unit 804 is coupled to an event poll unit 806 that is used, for instance, to query a central test manager (e.g., central test manager 810) for history relating to the test case. The central test manager obtains the history from, e.g., an event repository 817. Based on the history (e.g., no reported failures of the test case), the automation execution unit initiates execution of the test case. In other examples, the automation execution unit initiates execution of the test case based on other reported history. Many examples are possible.

In one or more aspects, a capability is provided to facilitate processing within a computing environment by facilitating system level testing of system units under test. In one or more aspects, test control processes running in parallel are testing a plurality of system units under test. This testing is improved by enabling a given test control process to obtain testing information, including, but not limited to, results of the same and/or different test cases, using a central test manager communicatively coupled to the test control processes. By improving the testing, error determination and/or error correction are improved, which enhances accurate processing within the computing environment. Further, test and/or development processes are improved by minimizing errors to be analyzed.

Efficiency is improved by providing coordination of verification tasks to be completed. By sharing information and coordinating efforts, the use of testing resources is reduced. For example, for hardware testing, less hardware prototypes are built, saving in costs and time.

One or more aspects may be used in many types of computing environments, including cloud computing environments in which multiple partitions are executing different workloads. If an error occurs, each partition may be made aware of the state of the execution on other partitions at the time of the event. Runtime processing is improved by enabling runtime decision making based on historical information obtained using, for instance, a central test manager.

One or more aspects of the present disclosure are tied to computer technology and facilitate processing within a computer, improving performance thereof. For instance, processing within a computing environment is improved by providing a capability to facilitate testing of systems under test that improves the testing performance, as well as processing within a production environment resulting from the testing. Resource usage within the computing environment to unnecessarily execute repetitive problem test cases is reduced, enhancing system performance. Processing within a processor, computer system and/or computing environment is improved.

In one or more aspects, runtime decision making is used to forecast the feasibility of future test cases, and the collection of meaningful/contextual data for post-run analysis is facilitated. One or more aspects enable re-creation of any given environment that allows for fix verification (e.g., merge the run logs); minimize, during post analysis, duplicate problem writing; and monitor and report the health of the test cases (e.g., checks if the test cases that are similar deviate from known runtime/results).

Other aspects, variations and/or embodiments are possible.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

Yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other techniques may be used to select a test case, configure test cases, perform testing and/or perform one or more other aspects of the present disclosure. Many variations are possible.

Various aspects and embodiments are described herein. Further, many variations are possible without departing from a spirit of aspects of the present disclosure. It should be noted that, unless otherwise inconsistent, each aspect or feature described and/or claimed herein, and variants thereof, may be combinable with any other aspect or feature.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
  at least one computer readable storage medium and program instructions collectively stored on the at least one computer readable storage medium to perform operations comprising:
    system level testing one or more systems under test by a plurality of test control processes executing in parallel while providing inter-communication among test control processes of the plurality of test control processes via a central test manager, the system level testing including executing multiple test cases in parallel in system level testing the one or more systems under test, and wherein the system level testing comprises:

initiating execution, by one test control process of the plurality of test control processes executing in parallel, of a test case used in the system level testing of a virtual machine of a system under test of the one or more systems under test;

prior to executing the test case, sending a query, by the one test control process, to the central test manager to determine history data relating to execution of the test case by one or more other test control processes of the plurality of test control processes executing in parallel;

obtaining, by the one test control process, the history data related to execution of the test case by another test control process of the plurality of test control processes executing in parallel, based on the query, wherein the history data includes contextual information related to execution of the test case by the one or more other test control processes of the plurality of test control processes executing in parallel; and making a runtime decision, by the one test control process, whether to continue execution of the test case based on the obtained history data, and based on the runtime decision, continuing execution of the test case, by the one test control process based on the obtained history data related to execution of the test case, to perform system level testing of the virtual machine of the system under test of the one or more systems under test.

2. The computer program product of claim 1, wherein the virtual machine of the system under test is one virtual machine of the system under test of a plurality of virtual machines of the system under test, and wherein the system level testing is performed on the plurality of virtual machines of the system under test by test control processes of the plurality of test control processes executing in parallel, the test control processes being communicatively coupled to the central test controller.

3. The computer program product of claim 2, wherein the operations further include:

determining, by the one test control process, that an error associated with execution of the test case has occurred; and providing an indication of the error to the central test manager for access by further test control processes of the plurality of test control processes.

4. The computer program product of claim 1, wherein the operations further include recording in a data repository, using the one test control process, execution information relating to execution of the test case.

5. The computer program product of claim 1, wherein the operations further include providing test case information to the central test manager to facilitate obtaining relevant history data from the central test manager for future test cases.

6. The computer program product of claim 5, wherein the test case information includes a start time of the test case, an end time of the test case, one or more progress indicators of the test case and test case results.

7. The computer program product of claim 1, wherein the history data of the test case includes an indication of a failure of a previous execution of the test case on another virtual machine of the system under test.

8. The computer program product of claim 1, wherein the history data of the test case includes an indication of success of a previous execution of the test case on another virtual machine of the system under test.

9. The computer program product of claim 1, wherein the history data of the test case includes an indication of no previous history of execution of the test case.

10. The computer program product of claim 1, wherein the operations further include continuing execution of the test case based on a selected preference.

11. A computer system for facilitating processing within a computing environment, the computer system comprising:

a memory; and at least one device coupled to the memory, wherein the computer system is configured to perform a method, the method comprising:

system level testing one or more systems under test by a plurality of test control processes executing in parallel while providing inter-communication among test control processes of the plurality of test control processes via a central test manager, the system level testing including executing multiple test cases in parallel in system level testing the one or more systems under test, and wherein the system level testing comprises:

initiating execution, by one test control process of the plurality of test control processes executing in parallel, of a test case used in the system level testing of a virtual machine of a system under test of the one or more systems under test;

prior to executing the test case, sending a query, by the one test control process, to the central test manager to determine history data relating to execution of the test case by one or more other test control processes of the plurality of test control processes executing in parallel;

obtaining, by the one test control process, the history data related to execution of the test case by another test control process of the plurality of test control processes executing in parallel, based on the query, wherein the history data includes contextual information related to execution of the test case by the one or more other test control processes of the plurality of test control processes executing in parallel; and making a runtime decision, by the one test control process, whether to continue execution of the test case based on the obtained history data, and based on the runtime decision, continuing execution of the test case, by the one test control process based on the obtained history data related to execution of the test case, to perform system level testing of the virtual machine of the system under test of the one or more systems under test.

12. The computer system of claim 11, wherein the virtual machine of the system under test is one virtual machine of the system under test of a plurality of virtual machines of the system under test, and wherein the system level testing is performed on the plurality of virtual machines of the system under test by test control processes of the plurality of test control processes executing in parallel, the test control processes being communicatively coupled to the central test manager.

13. The computer system of claim 12, wherein method further includes:

determining, by the one test control process, that an error associated with execution of the test case has occurred; and providing an indication of the error to the central test manager for access by further test control processes of the plurality of test control processes.

14. The computer system of claim 11, wherein the method further includes recording in a data repository, using the one test control process, execution information relating to execution of the test case.

15. The computer system of claim 11, wherein the method further includes providing test case information to the central test manager to facilitate obtaining relevant history data from the central test manager for future test cases.

16. A computer-implemented method of facilitating processing within a computing environment, the computer-implemented method comprising:

system level testing one or more systems under test by a plurality of test control processes executing in parallel while providing inter-communication among test control processes of the plurality of test control processes via a central test manager, the system level testing including executing multiple test cases in parallel in system level testing the one or more systems under test, and wherein the system level testing comprises:

initiating execution, by one test control process of the plurality of test control processes executing in parallel, of a test case used in the system level testing of a virtual machine of a system under test of the one or more systems under test;

prior to executing the test case, sending a query, by the one test control process, to the central test manager to determine history data relating to execution of the test case by one or more other test control processes of the plurality of test control processes executing in parallel;

obtaining, by the one test control process, the history data related to execution of the test case by another test control process of the plurality of test control processes executing in parallel, based on the query, wherein the history data includes contextual information related to execution of the test case by the one or more other test control processes of the plurality of test control processes executing in parallel; and making a runtime decision, by the one test control process, whether to continue execution of the test case based on the obtained history data, and based on the runtime decision, continuing execution of the test case, by the one test control process based on the obtained history data related to execution of the test case, to perform system level testing of the virtual machine of the system under test of the one or more systems under test.

17. The computer-implemented method of claim 16, wherein the virtual machine of the system under test is one virtual machine of the system under test of a plurality of virtual machines of the system under test, and wherein the system level testing is performed on the plurality of virtual machines of the system under test by test control processes of the plurality of test control processes executing in parallel, the test control processes being communicatively coupled to the central test manager.

18. The computer-implemented method of claim 17, further comprising:

determining, by the one test control process, that an error associated with execution of the test case has occurred; and providing an indication of the error to the central test manager for access by further test control processes of the plurality of test control processes.

19. The computer-implemented method of claim 16, further comprising recording in a data repository, using the one test control process, execution information relating to execution of the test case.

20. The computer-implemented method of claim 16, further comprising providing test case information to the central test manager to facilitate obtaining relevant history data from the central test manager for future test cases.

\* \* \* \* \*